United States Patent Office 3,153,780
Patented Oct. 20, 1964

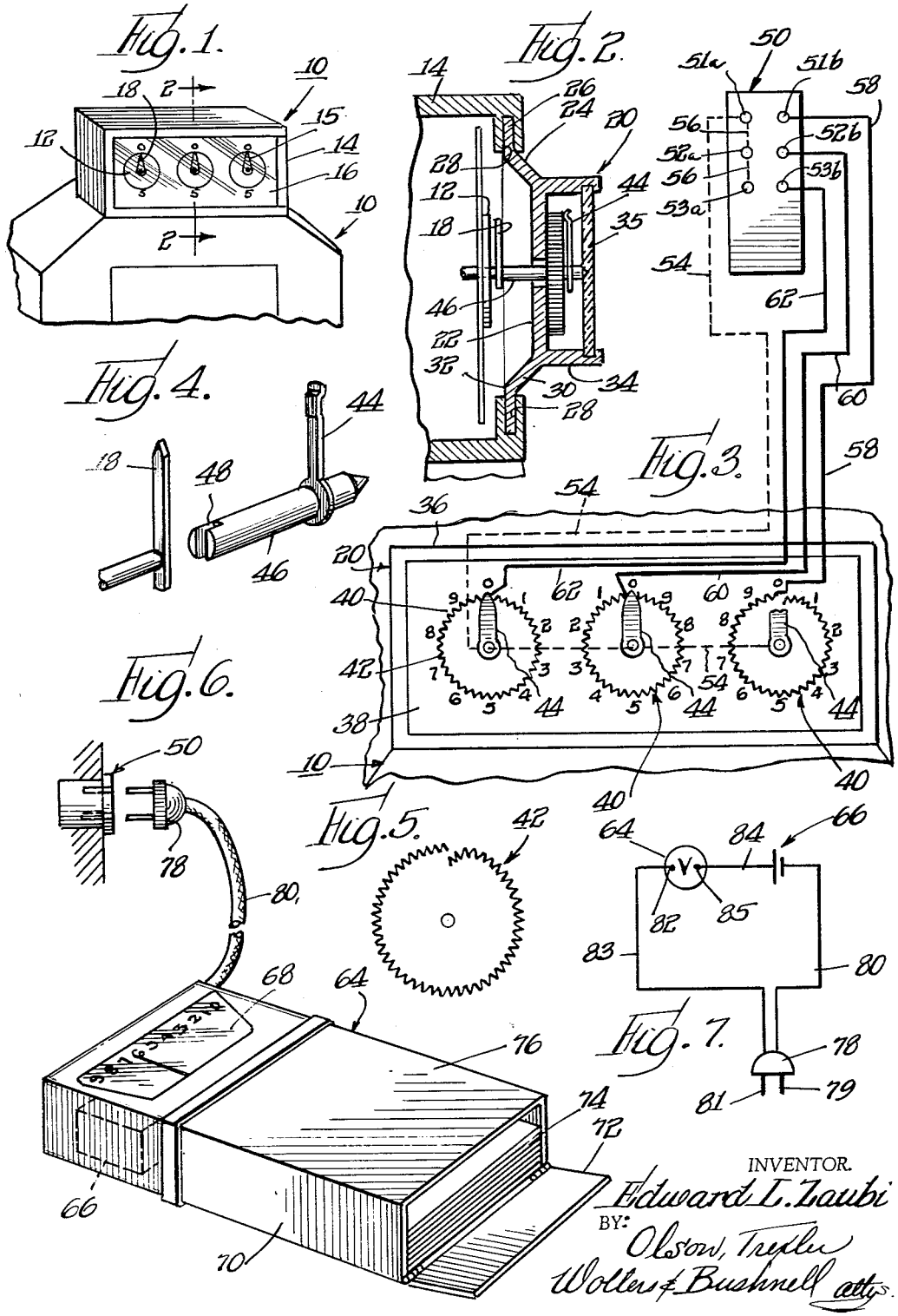

3,153,780
REMOTE ELECTRICAL READING OF
UTILITY METERS
Edward L. Zaubi, Springfield, Ill., assignor to Muntz
TV, Inc., Wheeling, Ill., a corporation of Delaware
Filed June 26, 1961, Ser. No. 122,373
5 Claims. (Cl. 340—188)

This invention relates to utility meters for indicating the quantity of electricity, gas, or water consumed, and more particularly, pertains to apparatus for reading such meters at a station remote therefrom.

Private dwellings throughout the nation are each provided with one or more meters for recording the number of units of gas, electricity, or water consumed within the dwelling. These meters are frequently owned by the particular utility company and are often mounted within the dwelling in the basement, vestibule or the like. An employee of the utility company visits each dwelling monthly or tri-monthly to obtain the meter reading for purposes of billing the consumer. When the meters are mounted indoors, the company employee must disturb a member of the household to request admittance onto the premises for purpose of reading the meter. Obviously, this is an inconvenience to the member of the household who is disturbed as well as to the company employee wherein considerable time is expended simply in arousing a member of a household to obtain admission thereinto. Having in mind the aforementioned shortcomings, it is an important object of this invention to provide means to facilitate reading utility meters mounted within private dwellings whereby the need to obtain access to the dwelling is entirely obviated.

Another object of this invention is to provide a reading station adapted to be disposed at the exterior of a dwelling, the station being in communication with a utility meter disposed within the dwelling to facilitate reading thereof.

In conjunction with the latter object, it is still another object to provide improved portable meter means cooperable with the reading station for indicating the units recorded on the utility meter disposed within the dwelling.

Yet another object of this invention is to provide an apparatus for attachment to an existing utility meter disposed within a dwelling, such apparatus being operatively associated with a reading station on the exterior of the dwelling and including an electric meter means detachably cooperable with the reading station to indicate the reading of the utility meter.

A further object of this invention is to provide an improved construction and arrangement for remote reading of utility meters and the like, such arrangement being economical to manufacture and install, simple to use, and flexibly adapted for mounting on an existing utility meter.

Further features of this invention pertain to the particular arrangement of the elements thereof whereby the above outlined and additional operating features are attained.

The invention, both as to its organization and method of operation, together with further objects and advantages therewith, will best be understood by reference to the following specification taken in connection with the accompanying drawing wherein like reference numerals are used to designate like parts throughout, in which:

FIGURE 1 is a fragmentary perspective view of the upper portion of a utility meter showing particularly the recording dials thereof;

FIG. 2 is an enlarged, vertical sectional view taken generally in the direction of the arrows along the line 2—2 in FIG. 1, but showing in association with the recording dials of the utility meter apparatus made in accordance with and embodying the principles of the present invention, certain portions thereof being shown in elevation for purpose of clarity;

FIG. 3 is an elevational view of the housing shown in FIG. 2 and illustrating diagrammatically the electrical circuit interconnecting the various parts of the invention;

FIG. 4 is an enlarged, exploded perspective view of a dial pointer of the utility meter and a rheostat shaft means employed in the present invention;

FIG. 5 is an enlarged elevational view of a rheostat grid embodied in the present invention;

FIG. 6 is a perspective view of an electric meter of the invention adapted to engage a remote reading station shown therein as an outdoor socket; and FIG. 7 is a circuit diagram of the electric meter shown in FIG. 6.

Referring now to FIG. 1 of the drawing, there is shown therein a utility meter generally designated by the numeral 10 of the type commonly used to record on dials 12 the units of gas, electricity or water consumed in the particular circuit to which the meter 10 is attached. The dials 12 are arranged in a row and are disposed at the upper portion of the meter 10 enclosed by a housing 14, the forward portion of the housing frequently being provided with a transparent glass panel 16. Each of the recording dials 12 is provided with a dial pointer 18 driven by a mechanism (not shown) to indicate the units consumed in the system. By convention, the center dial pointer 18 shown in FIG. 1 is operatively rotatable in a counter-clockwise direction while the outer two dial pointers 18 are operatively rotatable in a clockwise direction.

Referring particularly to FIGS. 2–4, a sub-housing 20 is shown mounted on the housing 14 over the dials 12 thereof, the glass panel 16 being dismounted. A rear wall 22 of the sub-housing 20 is provided with an inclined panel 24 which merges with a vertically disposed flange 26 received within a groove 28 in the housing 14 which groove 28 formerly received the glass panel 16. The lower portion of the rear wall 22 is also provided with a downwardly sloping panel 30 joined to a vertically disposed flange 32 received within a similar groove 28 in the housing 14.

Being of generally box-like construction, the sub-housing 20 has spaced apart bottom 34 and top walls 36 joined to the rear wall 22. A removable transparent front wall 38 completes the enclosure of the housing 20. Within the sub-housing 20 there is mounted a plurality of rheostats 40, three being shown herein as illustrative of an embodiment of the invention.

The rheostats 40 are arranged on the back wall 22 in a spaced relationship complementary to the spacing of the dials 12 on the meter 10. That is, each of the rheostats 40, has a circular grid 42 which is mounted coaxial with a dial 12 and in register therewith. An arm 44 of the rheostat 40 is carried by a shaft 46, an end of the shaft 46 having a slot 48 therein providing bifurcated portions thereon, shown best in FIG. 4. This end of the shaft 46 is expressly adapted to engage the dial pointer 18 of the dial 12 of the meter 10. Thus, it is seen that the position of the pointer 18 controls the positions of the rheostat arm 44 with respect to the circular grid 42.

To provide for reading of the meter 10 from a point immediately adjacent thereto, the removable front wall 38 of the sub-housing 20 is provided with an array of scale graduations complementary to those of the dials 12. Being that the rheostat arms 44 are disposed immediately inwardly of the transparent front wall 38, the arms 44 act as pointers for the scales on the front wall 38.

The sub-housing 20 and the apparatus enclosed therein is easily mounted on the utility meter 10. More specifically, the glass panel 16 is dismounted from the housing 14 by first removing one of the vertical side frame members having the groove 28 therein. The glass panel 16 may then be withdrawn sideways from the housing 14. In its place the sub-housing 20 is mounted on the housing 14 with the flange members 26 and 32 disposed in the grooves 28. During this step the arms 44 and shafts 46 are dismounted from the rheostats 40. After the sub-housing 20 is in proper position the aforementioned vertical side frame member is replaced thereby locking the sub-housing 20 on the utility meter 10. Next the transparent front panel 38 is removed from the sub-housing 20 if it has already been assembled thereon. Clear access being had to the rheostate grids 42, the shaft 46 carrying the arm 44 is inserted through the hole in the rear wall 22 to engage the dial pointer 18 which is received by the slot 48 in the end of the shaft 46. Care is taken to maintain the dial pointer 18 and the slider arm 44 in exact alignment so that the arm 44 will indicate for visual observation through the wall 38 the exact reading of the dial 12. After all of the rheostat shafts 46 are arranged in their proper positions the transparent panel 38 is then mounted on the front of the housing.

The rheostats 40 are electrically connected with a remote reading station 50 which may be mounted outside of the building or dwelling in which the meter 10 is disposed. More particularly, the remote station 50 is provided with three pairs of receptacle openings or terminal points 51a–51b, 52a–52b, and 53a–53b, one pair for each of the rheostats 40. A line 54 interconnects the terminal point 51a with the slider arms 44 of each of the three rheostats 40. A jumper line 56 interconnects the three left-hand terminal points 51a, 52a, and 53a. Of the three right-hand terminal points 51b, 52b, and 53b, the point 51b is connected to the grid 42 of the right-hand rheostat 40 by a line 58. The point 52b is interconnected to the grid 42 of the center rheostat 40 by a line 60. The terminal point 53b is interconnected to the grid 42 of the left-hand rheostat 40 by the line 62. Thus, it is to be appreciated that when a resistance reading is taken between the topmost pair of terminal points 51a and 51b, the resistance of the circuit defined by the lines 54, 58, and the right-hand rheostat 40 is measured. Similarly, when the central pair of terminal points 52a and 52b are engaged by a resistance meter, the resistance is measured in the circuit defined by the lines 54, 60 and the central rheostat 40. The lowermost terminal points 53a and 53b are contacted to measure the resistance of the circuit defined by the lines 54, 62 and the left-hand rheostat 40.

A meter 64, shown in FIG. 6 affords portable means for measuring the resistance at the remote reading station 50 and thereby the readings of the rheostats 40 operatively connected to the dials 12 of the utility meter 10. More particularly, the portable meter 64 is of a variety known as a resistance meter or ohmmeter and includes a self-powering battery 66, shown in broken lines in FIG. 6. A scale 68 of the meter 64 is graduated in the same units as the meter 10 so as to read directly in the particular units of the dials 12, i.e., cubic feet, kilowatts, or gallons. This obviates using a conversion factor to correlate the two scales.

The resistance meter 64 includes a rectangular box-like housing 70 which encloses the meter movement as well as the D.C. battery 66. One end of the housing 70 is provided with a spring-hinged door 72 affording access to a compartment in the housing 70 which holds a supply of record cards 74 on which the meter reading may be written. On the top wall of the housing 70 a planar writing surface 76 is provided adjacent to the meter scale 68. Thus, it is seen that a record card 74 may be removed from within the housing 70 and placed upon the writing surface 76 prior to reading the scale 68.

A bifurcated jack or male plug 78 is provided in the meter circuit, one prong 79 of the jack 78 being electrically connected to a negative terminal of the battery 66 by a line 80 the other prong 81 being joined to a first terminal 82 on the meter movement by a line 83. The resistance meter 64 is interconnected to a positive terminal of the battery 66 by the line 84 connected to a second meter terminal 85. The jack 78 is insertable into the pairs of receptacle openings, 51a–51b, 52a–52b, and 53a–53b to read the rheostats 40, one rheostat 40 being read at a time.

Thus it is seen that the remote reading station 50 may be mounted at the exterior of a dwelling and a substantial distance away from the utility meter 10. This arrangement affords a great convenience to both the dwelling owner and the meterman from the utility company. Carrying the portable resistance meter unit 64, the utility company meterman need simply to insert the jack 78 into the receptacle openings in the station 50 to obtain an accurate reading of the meter 10 disposed within the dwelling. Because no occupant of the dwelling need be aroused to gain access to the reading station 50, the meterman saves a substantial amount of time and the occupant of the dwelling remains undisturbed.

The provision of a planar writing surface 76 on the meter housing 70 facilitates quick and accurate inscription of the meter scale indication on the record cards 74. Furthermore, by affording a storage space for a supply of record cards 74 within the meter housing 70, a compact and efficiently useable meter kit is provided for the meterman. The meter scale 68 being graduated in the same units as the utility meter 10, an unskilled operator may obtain accurate readings without need of conversion factors.

While there has been described what is at present considered to be the preferred embodiment of the invention, it will be understood that various modifications may be made therein, and it is intended to cover in the appended claims all such modifications as fall within the true spirit and scope of the invention.

This invention is hereby claimed as follows:

1. In apparatus for remote reading of utility meters having recording dials including dial pointers rotatable thereover, the combination comprising: a housing mountable on the utility meter adjacent to the recording dials thereof; a rheostat mounted on said housing and including a slider finger and an arcuate resistance grid arranged coaxially with one of the recording dials of the utility meters; a rotatable shaft carrying said slider at one end thereof and having at the opposite end thereof means to engage the dial pointer of said one recording dial for turning of said slider finger synchronously with said dial pointer; socket means remote from said housing and electrically connected to said rheostat; and portable meter means including a self-contained battery and detachably cooperable with said socket means to indicate for visual observation the resistance of said rheostat and the position of the aforementioned one dial pointer with respect to its associated recording dial.

2. In apparatus for remote reading of utility meters having recording dials including dial pointers rotatable thereover, the combination comprising: a housing mountable on the utility meter adjacent to the recording dials thereof; a rheostat mounted on said housing and including a slider finger and an arcuate resistance grid arranged coaxially with one of the recording dials of the utility meter; a transparent panel on said housing having a calibrated scale disposed coaxially with said resistance grid; a rotatable shaft carrying said slider finger at one end thereof and having at the opposite end thereof means to engage the dial pointer of said one recording dial for turning of said slider finger synchronously with said dial pointer; socket means remote from said housing and electrically connected to said rheostat; and electric meter means including a self-contained battery and detachably discrete from said housing and detachably cooperable with said socket means to indicate for visual observation the resistance of said rheostat and the position of the aforementioned one dial pointer with respect to its associated recording dial.

3. In apparatus for remote reading with a self-powered, portable, electric meter of a stationary utility meter having a plurality of recording dials, each recording dial including a dial pointer rotatable thereover, the combination comprising: a housing mountable on the utility meter adjacent to the recording dials thereof; a transparent panel on said housing having a plurality of calibrated scales; a plurality of rheostats mounted on said housing inwardly of said transparent panel; each rheostat including a slider finger visible through said panel and mounted adjacent to one of said scales serving as a pointer therefor; mechanical means to operatively connect each slider finger to the respectively corresponding dial pointer on the utility meter for movement of said fingers synchronously with the respective dial pointers; means cooperable with the electric meter remote from said housing and having a number of connection stations at least equal to the number of said rheostats in said housing and respectively electrically connected thereto; means respectively electrically connecting each rheostat with the respectively corresponding connection station and portable meter means including a self-contained battery and connection means selectively cooperable with said connection stations to indicate for visual observation the position of each rheostat and corresponding dial pointer, said connection means and connection stations comprising plug-and-socket type connections.

4. In apparatus for remote reading with a self-powered, portable, electric meter of a stationary utility meter having a plurality of recording dials, each dial including a dial pointer rotatable thereover, the combination comprising: a housing mountable on the utility meter adjacent to the recording dial thereof; a transparent panel on said housing having a plurality of calibrated scales; a plurality of rheostats mounted on said housing inwardly of said transparent panel; each rheostat including a slider finger visable through said panel and mounted adjacent to one of said scales serving as a pointer therefor; rotatable shafts, one of said slider fingers being carried by each shaft at one end thereof, the opposite end of each shaft having a bifurcated portion adapted to engage the dial pointer of one of the recording dials on the utility meter for movement of said fingers synchronously with the respective dial pointers; means cooperable with the electric meter remote from said housing and the utility meter and having a number of connection stations at least equal to the number of said rheostats in said housing; means respectively electrically connecting each rheostat with the respectively corresponding connection station and portable meter means including a self-contained battery and connection means selectively cooperable with said connection stations to indicate for visual observation the position of each rheostat and corresponding dial pointer, said connection means and connection stations comprising plug-and-socket type connections.

5. In apparatus for remote reading of a utility meter having a plurality of recording dials, each dial including a dial pointer rotatable thereover, the combination comprising: a housing mountable on the utility meter adjacent to the recording dials thereof; a transparent panel on said housing having a plurality of calibrated scales; a plurality of rheostats mounted on said housing inwardly of said transparent panel; each rheostat including a slider finger visable through said panel and mounted adjacent to one of said scales serving as a pointer therefor; rotatable shafts, one of said slider fingers being carried by each shaft at one end thereof, the opposite end of each shaft having a bifurcated portion adapted to engage the dial pointer of one of the recording dials on the utility meters for movement of said fingers synchronously with the respective dial pointers; socket means remote from said housing and the utility meter and having a number of connection stations each respectively electrically connected to one of said rheostats; and portable electric meter means including a self-contained battery and discrete from said housing and detachably cooperable with said socket means to indicate for visual observation the resistance of said rheostats and the positions of the dial pointers with respect to their corresponding dials, said electric meter means including a casing having a chamber for holding recording cards therein.

References Cited in the file of this patent
UNITED STATES PATENTS

| | | |
|---|---|---|
| 2,280,775 | Mirk | Apr. 28, 1942 |
| 3,006,712 | Eichacker | Oct. 31, 1961 |